Figure 1:
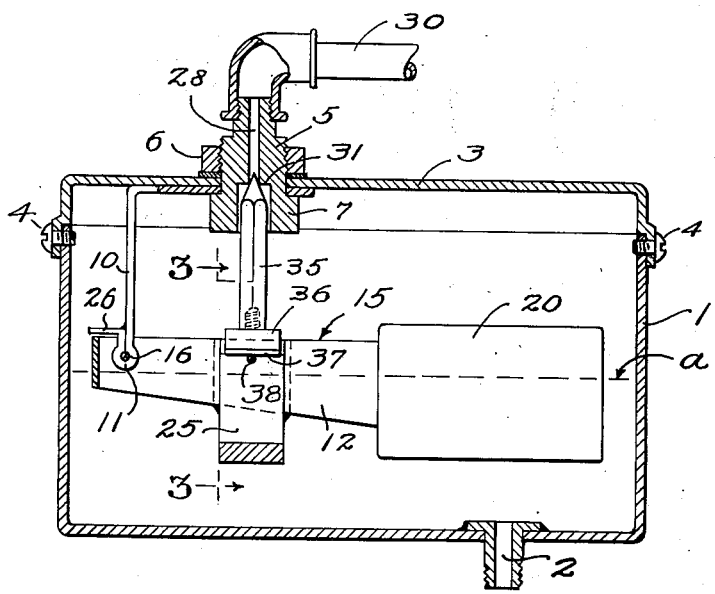

April 28, 1953　　　M. RESEK ET AL　　　2,636,508
MAGNETIC FLOAT-CONTROLLED VALVE MECHANISM
Filed March 28, 1947

INVENTOR.
Marc Resek and
Harold Kiefer
BY
Hull West
ATTYS.

Patented Apr. 28, 1953

2,636,508

UNITED STATES PATENT OFFICE 2,636,508

MAGNETIC FLOAT-CONTROLLED VALVE MECHANISM

Marc Resek, Cleveland Heights, Ohio, and Harold Kiefer, San Francisco, Calif., assignors to Perfection Stove Company, Cleveland, Ohio, a corporation of Ohio Application March 28, 1947, Serial No. 737,904

4 Claims. (Cl. 137—434)

This invention relates to improvements in the class of valve opening and closing mechanisms, particularly of the float actuated type.

In mechanisms of this class, especially where simplicity of construction and cheapness are important considerations, it is extremely difficult to produce a positively operated valve which is not cramped when moved in one direction or the other by the valve operating device. When, in an attempt to avoid such cramping, a spring is interposed between the valve and the device to provide self-adjustment of the valve to the seat, additional force is required in the closing operation due to the compressibility of the spring. Also, the spring may prevent satisfactory unseating of the valve.

Other kinds of operative connections have been developed for overcoming the fault, but in view of the compactness of structure required, it is difficult to make such connections sensitive enough to accomplish the purpose in view and yet rugged enough to withstand vibrations or abuse to which they are liable to be subjected in many applications of the valve mechanism. The use of jewel bearings would be prohibitive from a cost standpoint in the class of valve mechanisms with which our improvements are concerned.

The present invention resides in the inclusion of a magnet in the operative connections between the valve and its operating device, particularly where such device is float actuated, and which connections are capable of limited universal movement, all to the end that, when the mechanism functions in a manner to close the valve, the valve, while free to adjust itself to the seat, will be positively forced against the seat without liability of cramping, and when the mechanism functions in a reverse manner to open the valve, the weight of the actuating mechanism will be imparted to the valve through magnetic attraction to insure withdrawal of the valve from the seat, again without liability of cramping.

Therefore, it may be said that the invention was conceived with the principal objects in view of eliminating friction in the operative connections between a valve and its operating device; of safeguarding against cramping of the valve; of insuring a proper and positive seating of the valve, and of insuring withdrawal of the valve from its seat.

Other objects are to provide a simple and inexpensive construction incorporating the principles of our invention that is durable, is not likely to get out of order, and is therefore thoroughly reliable.

Figure 3:
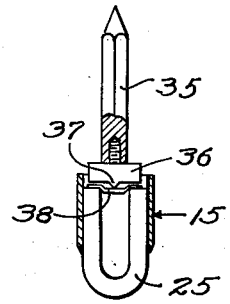
Figure 2:
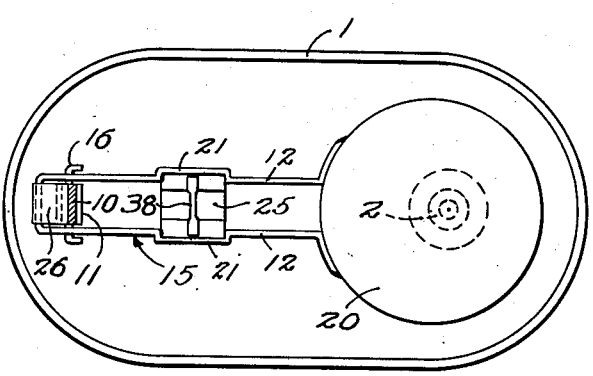

An embodiment of the invention, which is to be understood as illustrative rather than limiting, is shown in the accompanying drawing wherein Fig. 1 is a vertical section through a liquid receptacle equipped with our improved valve opening and closing mechanism; Fig. 2 is a plan view of the receptacle with its cover removed, the valve and armature lifted out, and the supporting bracket for the valve operating mechanism in section, and Fig. 3 is a sectional detail substantially on the line 3—3 of Fig. 1.

Referring to the drawing by the use of reference characters, and wherein like characters designate like parts in the several views, 1 denotes a liquid receptacle having an outlet connection 2. A cover 3 is shown as secured to the top of the receptacle by screws 4. Through an opening in the cover is projected upwardly the smaller threaded end of a fitting 5 to which a nut 6 is applied with a washer shown as compressed between the nut and the top surface of the cover. Clamped between the enlarged lower end 7 of said fitting and the underneath surface of the cover 3 is the base portion of a bracket 10. Said bracket is formed at its lower end to provide a sleeve-like bearing 11 that fits loosely between the sides 12 of a frame-like float arm designated generally by the reference numeral 15. The arm, according to the present embodiment, is constructed of a continuous piece of non-magnetic sheet metal, such as brass. A pivot pin, which may consist of a piece of wire, is extended through the bearing 11 and through holes in the sides 12 of the float arm.

To the end of the arm 15 remote from its pivotal connection with the bracket 10 is soldered or otherwise fastened a float 20. Intermediate the ends of the float arm, the sides 12 thereof are formed to provide inwardly facing channels 21 within which are fitted the legs of a permanent horseshoe magnet 25, said legs being soldered or otherwise secured within said channels. The magnet is desirably positioned with its upper end or poles an appreciable distance below the top plane of the arm 15. In order to limit the descent of the float, and the swinging of the float arm in a corresponding direction, a stop 26 is provided on the bracket 10, with which the adjacent end of the arm is arranged to engage.

The fitting 5 has a central bore 28 that constitutes the inlet port of the receptacle. Connected to the upper end of the fitting is a liquid supply pipe 30. The fitting 5 is counterbored at its lower end to provide a valve seat 31 with which is adapted to engage a tapered valve 35. The valve is shown as a pointed, square stem that may be made of brass. Suitably connected to the lower end of said stem is a square block of magnetic material, such as iron, that constitutes the armature of the magnet, designated 36. A V-shaped rib 37 extends across the bottom face of the armature midway between its lateral edges and said rib is adapted to engage a narrow abutment 38 that, in the present instance, is provided by a piece of wire, the ends of which are flattened and bear upon the tops of the branches of the magnet 25. The wire is suitably fastened in place, as by soldering its ends to the magnet or float arm. It will be observed that the sides of the armature 36 fit loosely within the upper ends of the channels 21. Thus, the armature is retained in operative relation to the magnet with the rib 37 thereof in a position at substantially right angles to the wire that constitutes the abutment 38. By virtue of the stop 26, the arm 15 is prevented from dropping sufficiently to permit dislodgment of the valve and armature from the remainder of the assembly that is carried by the cover 3.

The normal liquid level in the receptacle 1 is designated by the broken line a. As liquid flows from the receptacle through the outlet connection 2, said level recedes and the float descends to swing the corresponding end of the arm 15 downwardly a distance limited by the engagement of the opposite end of the arm with the stop 26. The weight of the float-lever-magnet assembly will be imparted, through magnetic attraction, to the armature 36 and, accordingly, to the valve 35. Thus the valve will be withdrawn from the seat 31 to admit liquid to the receptacle to replace that which flowed out and restore the normal liquid level to that indicated by the broken line a. The rise of the float, and the corresponding movement of the arm 15 will, through engagement of the rib 37 with the abutment 38, positively lift the valve against the valve seat and shut off the flow of liquid through the inlet port of the receptacle. During both the descent and ascent of the float, the armature is permitted limited rocking and sliding movement in all directions, so as to insure against improper setting of the valve or a cramping thereof. In other words, our improved operative connection between the valve and valve operating device, characterized by magnetic attraction and universal movement, provides a positive thrust of the valve against its seat, and a similar withdrawal of the valve from the seat proportional in power to the weight of the float-arm-magnet assembly plus that of the armature and valve; and any change of relationship between the valve and valve operating device is compensated for by the universal movement provided by the point contact between the rib 37 and the abutment 38.

Having thus described our invention, what we claim is:

1. Improved motion transmitting means for incorporation in a valve mechanism of the type including a valve seat, a valve for cooperation with said seat, and a pivoted, float operated arm for moving the valve toward the seat as the float rises and for moving the valve away from the seat as the float descends; said motion transmitting means comprising two devices, one of said devices consisting of a permanent magnet, and the other consisting of an armature, the devices rockingly engaging each other and being constantly held together solely by magnetic attraction, one of said devices being secured to the float operated arm of the valve mechanism of the aforesaid type, and the other of said devices being fixedly attached to the valve of such mechanism.

2. Improved motion transmitting means for incorporation in a valve mechanism of the type including a valve seat, a valve for cooperation with said seat, and a pivoted, float operated arm for moving the valve toward the seat as the float rises and for moving the valve away from the seat as the float descends; said motion transmitting means consisting of a permanent magnet secured to the float operated arm of the valve mechanism of the aforesaid type, and an armature fixedly attached to the valve of such mechanism, the magnet and armature having substantially point contact with each other so as to be capable of relative universal movement and being constantly held in engagement with each other solely by magnetic attraction.

3. Improved motion transmitting means for incorporation in a valve mechanism of the type including a valve seat, a valve for cooperation with said seat, and a pivoted, float operated arm for moving the valve toward the seat as the float rises and for moving the valve away from the seat as the float descends; said motion transmitting means including two devices that are attached, respectively, to the float operated arm of the valve mechanism of the aforesaid type and to the valve thereof, one of said devices comprising a permanent magnet and the other of said devices comprising an armature, and a thrust element embodied in one of said devices, said element having a restricted bearing surface whereon the other device pivots for limited rocking motion, said other device being constantly held in contact with said element solely by magnetic attraction between the magnet and armature.

4. Improved motion transmitting means for incorporation in a valve mechanism of the type including a valve seat, a valve for cooperation with said seat, and a pivoted, float operated arm for moving the valve toward the seat as the float rises and for moving the valve away from the seat as the float descends; said motion transmitting means comprising a permanent horseshoe magnet attached to the float operated arm of the valve mechanism of the aforesaid type with its poles facing in the direction of the valve seat of such mechanism, an armature fixedly connected to the valve of such mechanism and disposed in operative relation to the poles of the magnet, and an elongated relatively narrow thrust element of non-magnetic material bridging the poles of the magnet, the armature having a rib at substantially right angles to said thrust element for engagement therewith, the rib of the armature being constantly held in contact with the thrust element solely by virtue of the magnetic attraction between the magnet and armature.

MARC RESEK.
HAROLD KIEFER.

References Cited in the file of this patent

UNITED STATES PATENTS

| Number | Name | Date |
|---|---|---|
| 186,755 | Quimby | Jan. 30, 1877 |
| 710,615 | Robertson | Oct. 7, 1902 |
| 1,611,398 | Wiggins | Dec. 21, 1926 |
| 1,803,879 | Tapp | May 5, 1931 |
| 1,806,001 | Simms | May 19, 1931 |
| 1,861,694 | Gingele | June 7, 1932 |
| 1,876,044 | Davis | Sept. 6, 1932 |
| 1,882,725 | Asire | Oct. 18, 1932 |
| 1,894,367 | Corcoran | Jan. 17, 1933 |
| 2,172,935 | Ewart | Sept. 12, 1939 |
| 2,231,153 | Davis | Feb. 11, 1941 |
| 2,307,723 | Anderson | Jan. 5, 1943 |
| 2,313,564 | Manly | Mar. 9, 1943 |
| 2,387,858 | Russel | Oct. 30, 1945 |

FOREIGN PATENTS

| Number | Country | Date |
|---|---|---|
| 5,567 | Great Britain | Jan. 31, 1884 |
| 380,267 | Great Britain | Sept. 15, 1932 |
| 589,617 | Germany | 1932 |